US011379338B2

(12) United States Patent
Nayak et al.

(10) Patent No.: US 11,379,338 B2
(45) Date of Patent: Jul. 5, 2022

(54) CUSTOMIZING OPTION-SELECTIONS IN APPLICATION BASED ON USAGE PATTERN

(71) Applicant: EMC IP Holding Company LLC, Hopkinton, MA (US)

(72) Inventors: Raksha B. Nayak, Bangalore (IN); Abhijit Ashok Bindage, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/661,436

(22) Filed: Oct. 23, 2019

(65) Prior Publication Data

US 2021/0124669 A1 Apr. 29, 2021

(51) Int. Cl.
*G06F 3/0481* (2022.01)
*G06F 11/34* (2006.01)
*G06F 3/04845* (2022.01)
*G06F 3/0482* (2013.01)
*G06Q 40/04* (2012.01)
*G06F 3/04812* (2022.01)

(52) U.S. Cl.
CPC ........ *G06F 11/3438* (2013.01); *G06F 3/0482* (2013.01); *G06F 3/04812* (2013.01); *G06F 3/04845* (2013.01); *G06Q 40/04* (2013.01)

(58) Field of Classification Search
CPC .. G06F 3/04883; G06F 3/0484; G06F 3/0482; G06F 3/04812; G06F 16/93; G06F 17/30442; H04M 3/493; G06Q 10/025; G06Q 40/04; H04N 21/44218
See application file for complete search history.

(56) References Cited

U.S. PATENT DOCUMENTS

| | | | | |
|---|---|---|---|---|
| 5,860,132 A | * | 1/1999 | Carter | G06F 3/0686 711/170 |
| 6,412,694 B1 | * | 7/2002 | Kumar | G06K 7/10861 235/462.01 |
| 7,295,995 B1 | * | 11/2007 | York | G06Q 30/02 705/26.8 |
| 9,747,057 B1 | * | 8/2017 | Ramani | G06F 3/067 |
| 9,747,642 B1 | * | 8/2017 | Counihan | G06T 13/20 |
| 9,779,457 B1 | * | 10/2017 | Fisher | G06F 3/0482 |
| 10,222,948 B2 | * | 3/2019 | Yun | G06F 3/0482 |

(Continued)

FOREIGN PATENT DOCUMENTS

JP 2000197771 A * 7/2000

OTHER PUBLICATIONS

Dell Technologies, "RSA Archer GRC Platform: Automate, Integrate, Manage & Report Across Your Enterprise," Data Sheet, https://www.rsa.com/content/dam/en/data-sheet/rsa-archer-grc-platform.pdf, 2018, 4 pages.

*Primary Examiner* — Steven P Sax
(74) *Attorney, Agent, or Firm* — Ryan, Mason & Lewis, LLP

(57) ABSTRACT

Data is collected during use of an application program to determine an option-selection usage pattern for a given user with respect to a given option-selection list with options listed in a first order. A recommendation is generated for a modified option-selection list with the options listed in a second order based on the option-selection usage pattern. The recommendation is presented to the given user.

21 Claims, 7 Drawing Sheets

(56) References Cited

U.S. PATENT DOCUMENTS

| | | | | |
|---|---|---|---|---|
| 2002/0138630 | A1* | 9/2002 | Solomon | G06F 16/686 709/228 |
| 2003/0103608 | A1* | 6/2003 | Pearson | H04M 3/493 379/88.18 |
| 2003/0182279 | A1* | 9/2003 | Willows | G06F 16/9017 707/E17.037 |
| 2005/0036068 | A1* | 2/2005 | Shin | H04N 21/4532 348/565 |
| 2006/0031795 | A1* | 2/2006 | Rahmat | G06F 30/398 716/111 |
| 2006/0234686 | A1* | 10/2006 | Grassiotto | H04L 67/22 455/414.1 |
| 2007/0047816 | A1* | 3/2007 | Graham | G06F 16/93 382/181 |
| 2008/0120129 | A1* | 5/2008 | Seubert | G06Q 10/10 705/35 |
| 2008/0235157 | A1* | 9/2008 | Frazier | G06Q 30/0283 705/400 |
| 2008/0305815 | A1* | 12/2008 | McDonough | H04M 3/493 455/466 |
| 2009/0178001 | A1* | 7/2009 | Verheyden | G11B 27/105 715/810 |
| 2010/0124887 | A1* | 5/2010 | Wellington | H04L 1/0016 455/69 |
| 2010/0217651 | A1* | 8/2010 | Crabtree | G06Q 10/00 705/7.22 |
| 2011/0040666 | A1* | 2/2011 | Crabtree | G06Q 50/06 705/37 |
| 2011/0171620 | A1* | 7/2011 | Tzeng | G09B 5/00 434/309 |
| 2011/0248848 | A1* | 10/2011 | Reeves | G08B 13/2417 340/540 |
| 2012/0271801 | A1* | 10/2012 | De Vries | G06F 16/2477 707/688 |
| 2013/0013474 | A1* | 1/2013 | Whelan | G06Q 10/067 705/35 |
| 2013/0332447 | A1* | 12/2013 | Bernier | G06F 16/29 707/713 |
| 2014/0040834 | A1* | 2/2014 | Thompson | G06F 3/04883 715/856 |
| 2014/0095945 | A1* | 4/2014 | Sankaran | G06F 11/0793 714/51 |
| 2014/0108333 | A1* | 4/2014 | Jain | H04L 67/22 707/609 |
| 2014/0281708 | A1* | 9/2014 | Adam | G06F 11/1479 714/18 |
| 2014/0282646 | A1* | 9/2014 | McCoy | H04N 21/44213 725/12 |
| 2014/0337098 | A1* | 11/2014 | Ganesh | G06Q 30/0203 705/7.32 |
| 2015/0094968 | A1* | 4/2015 | Jia | G01R 21/133 702/60 |
| 2015/0149959 | A1* | 5/2015 | Lee | G06F 9/449 715/810 |
| 2015/0178742 | A1* | 6/2015 | Smith | H04L 67/36 705/7.29 |
| 2015/0261402 | A1* | 9/2015 | Tanaka | G06F 3/017 715/762 |
| 2016/0203422 | A1* | 7/2016 | Demarchi | G06F 16/29 705/6 |
| 2016/0360336 | A1* | 12/2016 | Gross | H04M 1/72403 |
| 2017/0038964 | A1* | 2/2017 | Jang | G06F 3/0486 |
| 2017/0076338 | A1* | 3/2017 | Kerr | G06F 16/9537 |
| 2017/0168711 | A1* | 6/2017 | Temple | G06F 3/0233 |
| 2019/0129727 | A1* | 5/2019 | Bovet | H04L 67/306 |
| 2019/0213661 | A1* | 7/2019 | Brightwell | G06Q 30/0631 |
| 2019/0373320 | A1* | 12/2019 | Balsamo | G06F 21/44 |
| 2020/0265040 | A1* | 8/2020 | Jung | G06F 16/2457 |
| 2021/0055856 | A1* | 2/2021 | Capurso | G06T 7/74 |
| 2021/0096699 | A1* | 4/2021 | Ormond | G06F 3/04817 |
| 2021/0327450 | A1* | 10/2021 | Price | G06F 3/165 |

* cited by examiner

FIG. 2                              200

```
User turn ON the smart right-click customizer option. //He can turn this off anytime.
Let's denote right clicks as P.
Initialize N=50 (say).
//This means user is prompted for P 'with a new set of right click options rank after he
has right-clicked 50 times on P'.
Initialize a cuboid with the following parameters. //Just a 3D array
First dimension lists all the right clicks in the application.
//If there are x right clicks in the application then, the length of the cuboid would be x.
Second dimension lists the respective right-click options of P
//E.g. P [0] has the list of all options of right click P0
The length of third dimension is d   //d need not be a day but a fixed period.
Entire cuboid is filled with 0.
num_of_rt_clicks is an array having the length equal to the total number of right clicks in
the application.
//num_of_rt_clicks [0] tracks the total number of times the right clicks were made on rt
click P0
Initialize num_of_rt_clicks for each P as 0

While(true):
    When a right click is made on p, and an option o is sleeted on a day d,
    An event is raised to change, and the following changes are made:
        the cuboid entry at the position [p][o][d] is changed as follows:

If (cuboid [p][o][d]==0)
        Cuboid[p][o][d] = Weight *1. //weight will be calculated later
    Else
        Increment v such that
        if entry at Cuboid[p][o][d] is (Weight) *v, then cuboid[p][o][d] = (Weight) *(v+1);
    num_of_rt_clicks[p]++;
    if(num_of_rt_clicks[p]==N)
        let Q= number of days (or number of periods) it took to get N entries
        Initialize new recommendation list L for right click p as below.
        For each option o in p
            For (i=0; i<Q; i++)
                Substitute Weight with (i+1)/Q in cuboid[p][o][i]
                L[o]=L[o]+cuboid[p][o][i]
        Sort L in descending order. Omit options that have count 0
        Prompt the user with the new rank with order as in L.

If (user's response is ACCEPT)
            Retain N
        Else
            Increase N by a small random number //N wasn't enough to capture the
                user's actions.
            Invalidate first N/2 entries in the cuboid for the right click p
            //Invalidate along the third dimension i.e. older data is invalidated
```

TABLE 1

| TIME INTERVAL | USAGE OF RIGHT CLICK RC2 | | | COUNT | RECOMMEND NOW? |
| --- | --- | --- | --- | --- | --- |
| | EMAIL | EXPORT | CUT | DELETE | | |
| 1. | 0 | 0 | 0 | 0 | 0 | COUNT<20. NO |
| 2. | 0 | 2 | 4 | 0 | 6 | COUNT<20. NO |
| 3. | 0 | 5 | 0 | 3 | 14 | COUNT<20. NO |
| 4. | 3 | 3 | 0 | 0 | 20 | COUNT>=20. YES |

CUSTOMIZING OPTION-SELECTIONS IN APPLICATION BASED ON USAGE PATTERN

FIELD

The field relates generally to information processing systems, and more particularly to techniques for automatically customizing selection options presented to users in such information processing systems.

BACKGROUND

Many application programs (applications) today utilize a "right-click" operation. For example, in the right-click operation, an onscreen cursor is placed over an onscreen feature and the user clicks their pointing device (e.g., typically the right most button on a mouse) to display a list of options for selection (e.g., typically a pull-down menu). One of the limitations is that the right-click menu presents a set of options with a fixed rank or order. However, depending on the extent of the flexibility and functionality of the application, usage of the right-click operation to select from available options differs from one user to another. For example, one user may frequently or exclusively select the first option in the menu while others have to scroll down the menu to frequently or exclusively select the last option in the menu. This can be frustrating if the menu has many options.

SUMMARY

Embodiments of the invention provide techniques for automatically customizing selection options presented to users in an information processing system.

For example, in one embodiment, a method comprises the following steps. Data is collected during use of an application program to determine an option-selection usage pattern for a given user with respect to a given option-selection list with options listed in a first order. A recommendation is generated for a modified option-selection list with the options listed in a second order based on the option-selection usage pattern. The recommendation is presented to the given user.

The method may further enable the given user to accept or reject the recommendation. When the recommendation is accepted by the given user, the modified option-selection list is then presented to the given user the next time the given user uses the application program, e.g., the next time the user right-clicks on the option-selection list.

Advantageously, illustrative embodiments provide an automated tool that transparently learns a right-click usage pattern of the user with respect to an option selection menu in the application and provides an automatic suggestion to the user for the order of different options in the menu.

These and other features and advantages of the invention will become more readily apparent from the accompanying drawings and the following detailed description.

BRIEF DESCRIPTION OF THE DRAWINGS

FIG. 2 depicts pseudocode for a selection menu customizer based on a right-click usage pattern of a user, according to an illustrative embodiment.

FIG. 5 depicts a data structure for storing data collected by a selection menu customizer, according to an illustrative embodiment.

DETAILED DESCRIPTION

Figure 1:
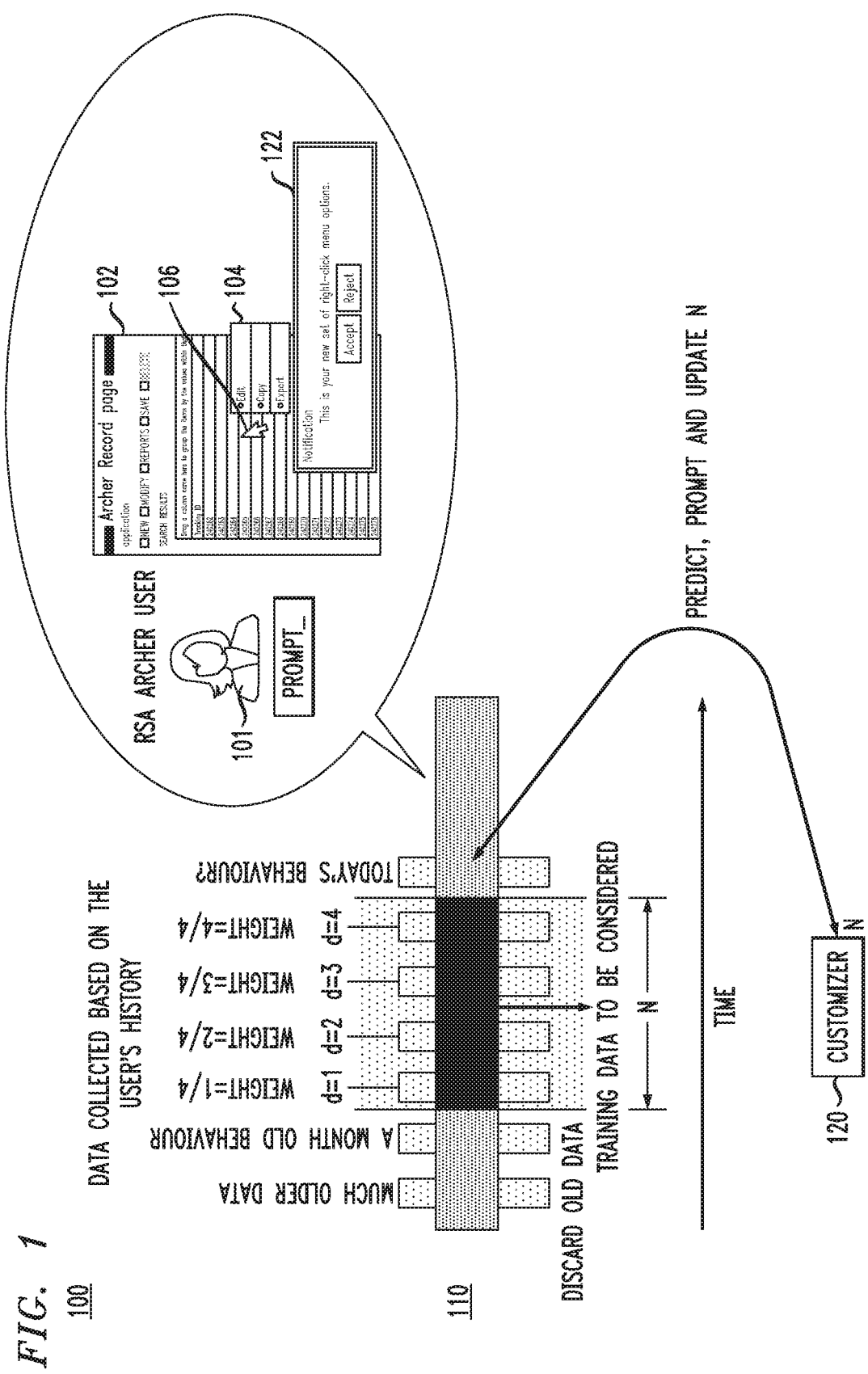
FIG. 1 depicts a selection menu customizer based on a right-click usage pattern of a user, according to an illustrative embodiment.

Illustrative embodiments may be described herein with reference to exemplary information processing systems such as, but not limited to, computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "information processing system," "cloud environment," "cloud computing platform," "cloud infrastructure," "data repository," "data center," "data processing system," "computing system," "data storage system," "computing environment," and the like as used herein are intended to be broadly construed, so as to encompass, for example, any arrangement of one or more processing devices.

As mentioned in the background section above, the right-click operation in applications today can be frustrating when a user constantly has to scroll through the fixed rank/order of the selection options to get to the one they most frequently use. For example, consider the RSA® Archer® application which supports business-level management of enterprise governance, risk and compliance (GRC). In the Archer® application today, one of the limitations is that the right-click context menu presents a set of options with a fixed rank or order. The Archer® application is itself a tool which allows users to select solutions in the way that they so desire. With such extensive flexibility, the usage of the right-click operation on a page differs significantly from one user to another.

For example, today in the Archer® application's right-click menu for a records page, the right-click operation presents a significant number of options such as, but not limited to, print, email, recalculate, export, etc. All of these options are presented in a fixed order. However, in Archer®, there is a lack of an automated tool that learns the user's actions and assists him in his customization.

Illustrative embodiments provide such an automated tool that transparently (to the user) learns the right-click usage patterns of the application user and provides automatic suggestions for the order of different options in the menu. A user can then accept the recommendation or reject it. In some embodiments, the user can switch on/off this customizer feature.

It is to be appreciated that while illustrative embodiments described herein with reference to FIGS. 1-6 refer to the Archer® application's right-click operation, alternative embodiments are not limited to this particular application. Further, embodiments are applicable to automatically customize any user option-selection operation associated with one or more software programs, i.e., embodiments are not limited to a right-click operation.

According to illustrative embodiments, a smart right-click customizer silently (transparently) records the right-click usage pattern of a user with respect to an application, with respect to a given right click on a page P. Note that "page" as illustratively used herein refers to any graphical user interface entity which has one or more unique right click menus. After it has recorded N number of entries, in other words, N number of right clicks on a page P, it makes internal calculations and prompts a new recommendation of right-click menu options with a most-used option positioned on the top of the menu list. With N being the collected data window length, this tool keeps discarding some of the previous collected data as it gets a new entry so that the user's changing preference is taken into account. The suitable value for N can be determined by the tool itself using a conventional re-learning process based on the user's selection when prompted. The older the data is, the less weight it has so that the more recent the data is, the more value it has. The weight is directly proportional to d or time. In one or more illustrative embodiments, the weights vary with time and all of them are normalized between 0 and 1 so that moderate importance is given to the newest data thus the data values are not biased.

Referring initially to FIG. 1, an information processing system environment 100 is depicted with a selection menu customizer based on a right-click usage pattern of a user, according to an illustrative embodiment. More particularly, FIG. 1 shows a user 101 currently viewing a given page 102 of an application (e.g., records page in Archer®) performing a right-click 104 on the page 102. The right-click is an operation that can be performed by the user 101 one or more times by moving a cursor 106 over a feature on the page 102 and pressing the right button on a mouse to display a meu of selectable options (edit, copy, export as shown in FIG. 1). Thus, each time the user 101 moves the cursor 106 over the feature and selects an option from the menu, it is counted as an individual right-click instance. Multiple instances of right-click selections for this particular feature are considered a right-click pattern. Other ways to perform a right-click 104 are contemplated to be within the scope of various alternative embodiments. Data 110 associated with the right-clicks of user 101 on right-click 104 is collected over time. Black shaded data is used as a current training data set. The length of the current training data window is N (i.e., corresponding to N right-clicks), as mentioned above. Collected data 110 is provided to selection menu customizer 120. Note that data collected prior to the time interval N is discarded. Customization is performed and one or more notifications 122 are presented to the user 101, as will be further described herein.

More particularly, customizer 120 gives a recommendation with a new ranking for the order of options for a given right-click 104 to the user 101 when he just right-clicked on feature of a page. The recommendation is given after the user 101 has right-clicked N times (corresponding the window length N in FIG. 1. That is, customizer 120 predicts, prompts, and then updates N. More specifically, predict means the customizer 120 prepares a customized ranking to be presented to the user 101. Prompt means the customizer 120 presents a notification 122 to user 101 with the options in the customized rank with an "accept" button and "reject" button for the right-click 104. Update N happens according to the response of the user 101, i.e. if he clicked accept, the N is retained because the user is satisfied with the value of N, else if he selects reject, N is incremented by a small random number so that more older actions of the user can be considered (expand the window length of N). Note that there is no restriction on what the length of N (the number of right-clicks that are to be considered as part of the pattern) can be. In some embodiments, N can be configured by the user 101, in which case it remains fixed. In other embodiments, N is configured by the system, in which case it changes according to a re-learning algorithm. In still other embodiments, a hybrid of the above methods can be implemented. Note that the pseudocode described next in the context of FIG. 2 assumes that a re-learning algorithm is applied on N.

Pseudocode 200 is depicted in FIG. 2 for execution by selection menu customizer 120 based on a right-click usage pattern of user 101, according to an illustrative embodiment. In the pseudocode 200, although it is mentioned as 'day d', it is to be understood that the subject time period need not be a day but rather can be any other time period. Pseudocode 200 is explained below in the context of cuboid 300 depicted in FIG. 3.

Assume a cuboid is used to capture the user's actions of all the right-clicks in the application. The cuboid is actually stored as a three-dimensional (3D) array in customizer 120. The 3D cuboid 300 in FIG. 3 has a length corresponding to the different right-clicks in the application. The width of cuboid 300 corresponds to the options belonging to the menus of those right-clicks respectively. Time is captured along the depth of cuboid 300. The values inside the blocks of the cuboid correspond to the count of the number of times that particular right-click was used. For example, cuboid block [0][3][5] represents the number of times the $3^{rd}$ option of right-click with ID 0 was used at the time period or day 5 (assuming that the total K right-clicks in the application are unique and numbered 0 to K). Note that in pseudocode 200, a right-click is denoted as P or p.

In an illustrative embodiment, weights are assigned such that the older the data, the lesser the weight it has. Weight is normalized between 0 and 1. Weight is calculated in an illustrative embodiment as follows. While capturing data in the cuboid, weight is initially kept as unknown because the customizer 120 does not know how many days/periods it takes to complete N right-clicks on a right-click P. Once N number of right-clicks are reached, customizer 120 calculates the number of days/periods (denoted in pseudocode 200 as Q) it took to reach N. Now the weight for day 1 is 1/Q, day 2 has the weight 2/Q, and the weight corresponding to the last day is Q/Q i.e., 1. The entry at cuboid block [p][o][d] represents weight*number of times the p-th right-click was used and o was selected on a day d.

A separate array is used to track if a total N number of right-clicks are made on p or not. When N is reached, the weights are calculated and substituted, the total count is made, and finally the user is prompted with the new recommendation 122.

Figure 3:
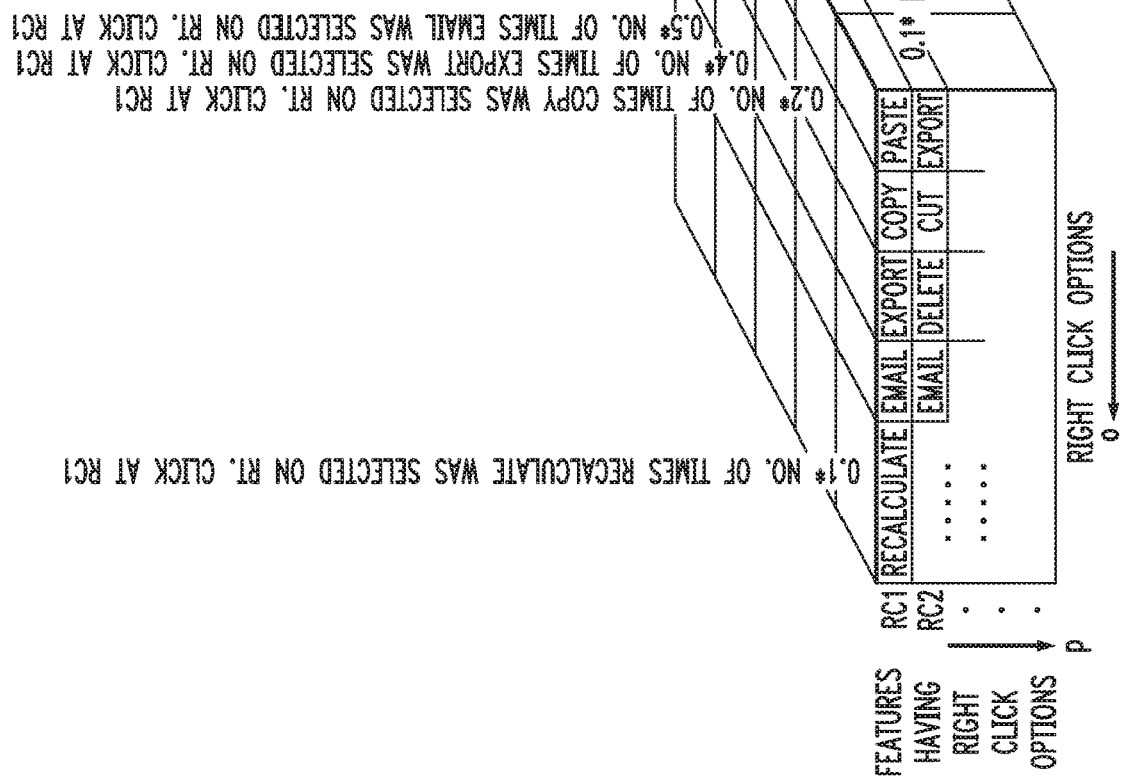
FIG. 3 depicts data collected by a selection menu customizer, according to an illustrative embodiment.

Note that although FIG. 3 uses a cuboid, it is not always uniform across two dimensions. First, on the dimension of time, since, for example, there are two right-clicks (RC1 and RC2) in an application where one of the right clicks RC1 is very rarely used and the count never reaches N, the cuboid area corresponding to the entries of RC1 is sparse. Whereas, on the other hand, the cuboid area for RC2 which is heavily used is dense. One part of the cuboid corresponding to RC2 has invalidated data since the data is old (in some embodiments, the old data needs can be archived or completely discarded) whereas the same part for RC1 is not invalidated.

Secondly, the dimension of options can be different between RC1 and RC2, because each right-click has a different number of options.

Figure 4:
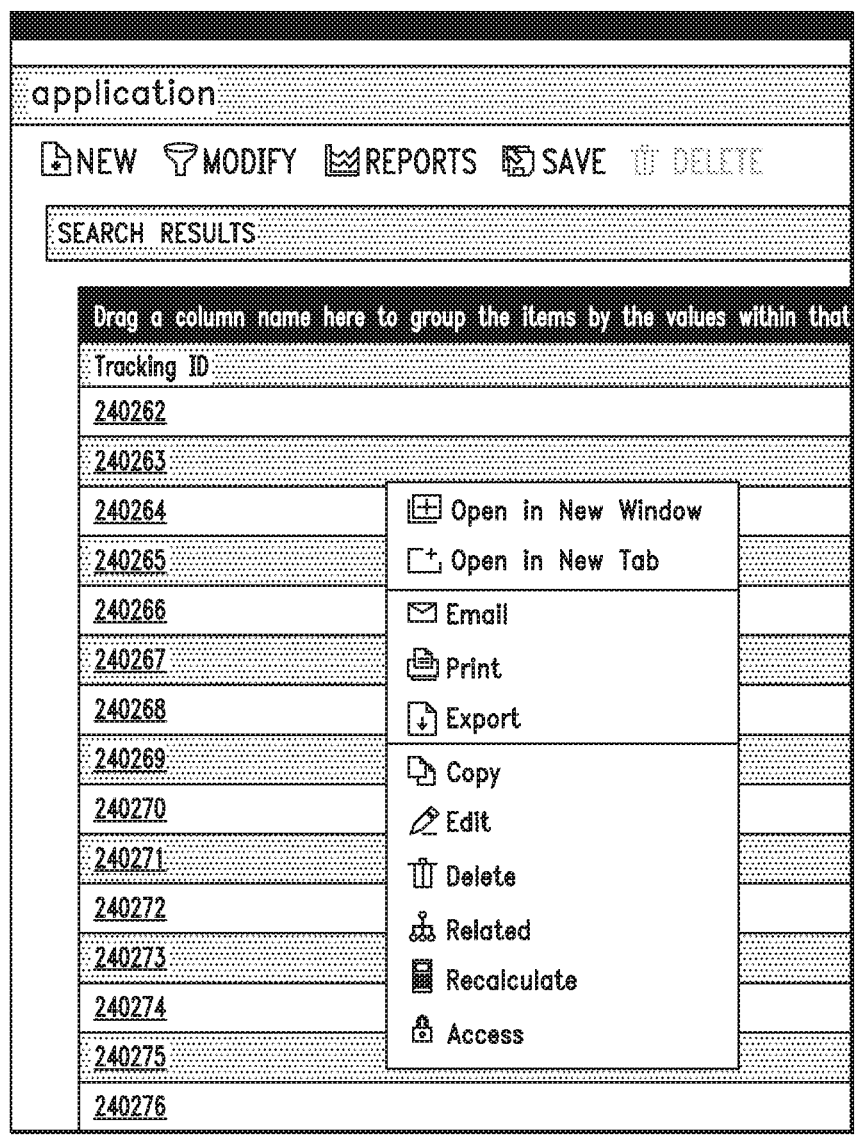
FIG. 4 depicts a selection menu associated with a records page in a given application program with which a selection menu customizer is implemented, according to an illustrative embodiment.

Thus, at any given point in time, data collected by the customizer 120 is shown in the example cuboid 300 in FIG. 3. Assume, as an example, the record browser page 400 in the Archer® application depicted in FIG. 4. Assume the Archer® application's records page is one of the most used pages in the application. Upon a right-click operation on the record, the options that pop-up are as shown in FIG. 4.

If a user 101 always wants to 'Edit' and not 'open in new window' for this page, then he would want it to be on the top, similarly if user 101 never uses 'Recalculate', then he might be annoyed to see it there.

To help him with the menu items order that he wants in a page, a customizer feature (provided by customizer 120) is turned ON upon which the transparent learning starts, and recommendations are given. The recommendations can be accepted, or the user can opt to remain with the same settings if he wants, or in some embodiments the user can manually customize the order suggested in the recommendation. Based on his input to the recommendations, N is modified automatically by customizer 120.

By way of example, assume that the Archer® application has K right-clicks. Referring back to FIG. 3, note that the cuboid shows data associated with two right-clicks: RC1 and RC2. RC1 has five options upon a right-click, i.e., Recalculate, Email, Export, Copy and Paste. RC2 has four options upon a right-click, i.e., Email, Delete, Cut and Export. The third dimension of the cuboid in FIG. 3 denotes time. Any addition of options/page leads to the additions in the size across x and y dimensions in the cuboid but the z dimension size N is determined by the user's action as mentioned above. The cuboid is populated as and when the user makes a right-click.

Assume, for example, the user actions for RC2 are as below:

Let N=20.
Time Interval 1: Never used right-click on RC2
Time Interval 2: 'Export' 2 times. 'Cut' 4 times
Time Interval 3: 'Export' 5 times. 'Delete' 3 times
Time Interval 4: 'Email' 3 times, 'Export' 3 times
This user right-click usage pattern is depicted in table 500 in FIG. 5.

Figure 6:
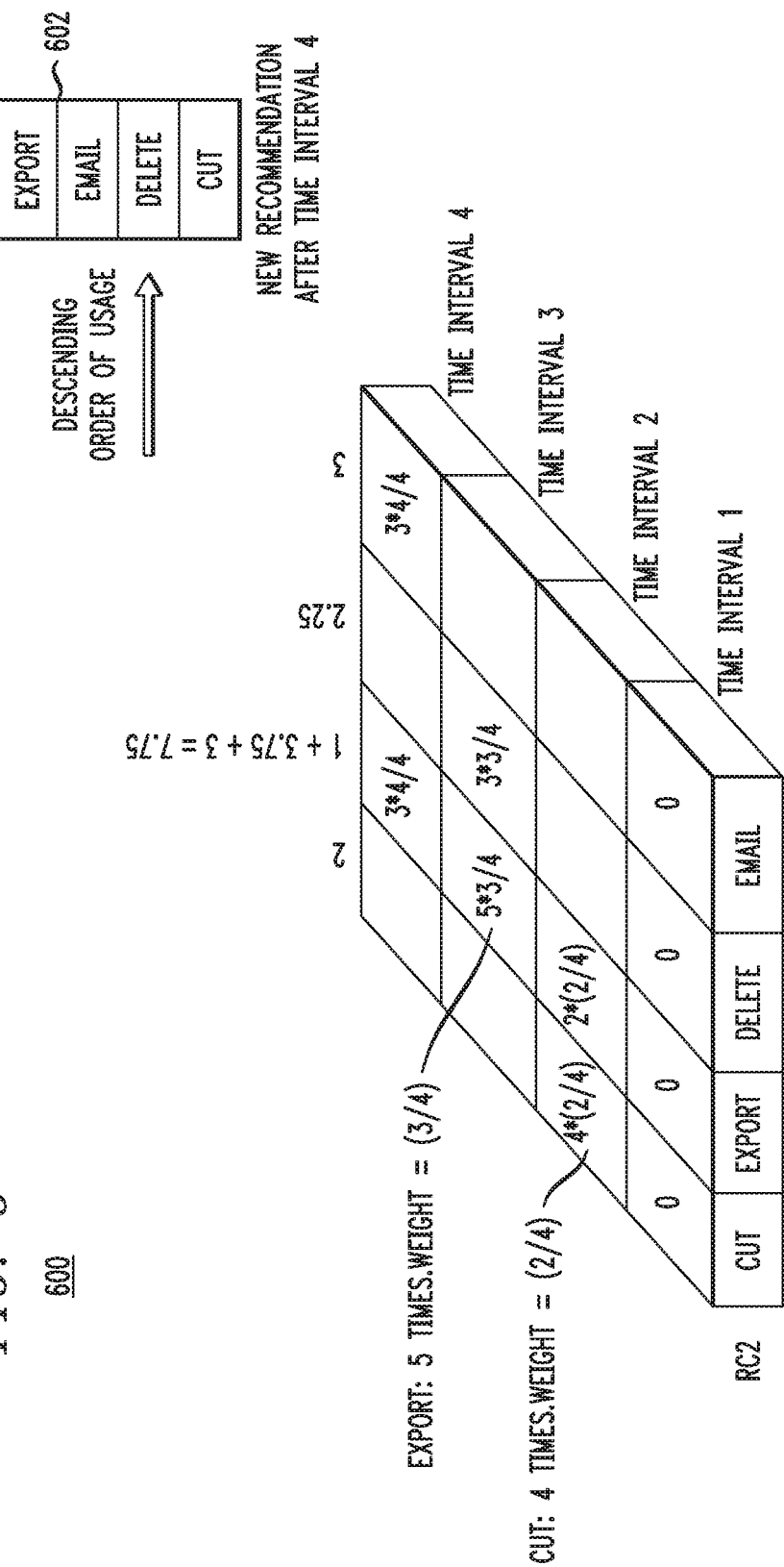
FIG. 6 depicts a customized selection menu generated by a selection menu customizer, according to an illustrative embodiment.

A slice of a cuboid corresponding to RC2 is depicted as 600 in FIG. 6. Further, recommendation 602 generated by the customizer 120 for a customized selection menu after time interval 4 is depicted. More particularly, the cuboid for RC2 in FIG. 6 shows the values according to the recordings in table 500 of FIG. 5. In other words, if user 101 had used RC2 and the usage pattern is such as the one shown in table 500 of FIG. 5, the cuboid would look as shown in FIG. 6 and the user 101 would get a recommendation 602 according to the calculations shown in FIG. 6 (N is 20 in this example).

Figure 7:
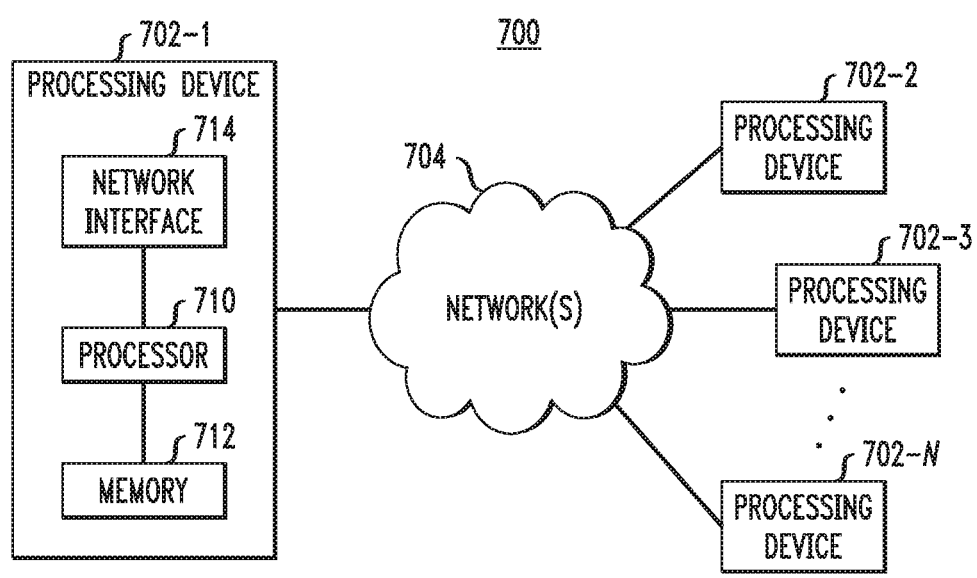
FIG. 7 depicts a processing platform used to implement a selection menu customizer based on a right-click usage pattern of a user, according to an illustrative embodiment.

FIG. 7 depicts a processing platform 700 used to implement a selection menu customizer based on a right-click usage pattern of a user, according to an illustrative embodiment. More particularly, processing platform 700 is a processing platform on which a computing environment with selection menu customization functionalities (e.g., FIGS. 1-6 and otherwise described herein) can be implemented.

The processing platform 700 in this embodiment comprises a plurality of processing devices, denoted 702-1, 702-2, 702-3, . . . 702-N, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
collecting data during use of two or more pages of an application program to determine an option-selection usage pattern for a given user with respect to a given option-selection list with options listed in a first order, the option-selection usage pattern being determined in association with receipt of a selection by the user of a threshold number of entries of one or more of the options of the given option-selection list;
determining a given point in time corresponding to a time in which the threshold number of entries is selected by the user;
assigning weights to the collected data based on time of selection of individual ones of the one or more options of the given option selection list relative to the given point in time wherein collected data closest to the given point in time is assigned a greater relative value than collected data remote from the given point in time;
generating a recommendation for a modified option-selection list with the options listed in a second order based on the option-selection usage pattern and the relative value assigned to the collected data; and
presenting the recommendation to the given user, the recommendation being presented via a graphical overlay on a given one of the two or more pages of the application program in which the modified option-selection list will be presented, the modified-option selection list being customized for a given set of operations that are capable of being performed for the given page;
wherein collecting data comprises discarding a portion of the collected data most remote from the given point in time upon occurrence of one or more additional selections by the user such that the threshold number of entries remains constant during one or more subsequent uses of the application program;
wherein determining the given point in time is recalculated in association with the occurrence of the one or more additional selections by the user to define one or more new given points in time;
wherein the determining, assigning, generating and presenting steps are repeated at the one or more new given points in time;
wherein, responsive to the recommendation being rejected by the user, the threshold number of entries is adjusted for the one or more new given points in time;
wherein the option-selection usage pattern is derived from right-click operations the given user performs for the application program;
further comprising generating a three-dimensional cuboid array data structure for storing the collected data, the three-dimensional cuboid array data structure comprising:
a first dimension with entries corresponding to respective ones of a plurality of option-selection lists of the two or more pages of the application program including the given option-selection list;
a second dimension with entries corresponding to respective ones of options in each of the plurality of option-selection lists; and a third dimension with entries corresponding to respective numbers of times that each of the options in each of the plurality of option-selection lists have been selected; and wherein the steps are executed by a processing device operatively coupled to a memory.

2. The method of claim 1, further comprising enabling the given user to accept or reject the recommendation.

3. The method of claim 2, further comprising presenting the modified option-selection list to the given user the next time the given user uses the application program, when the recommendation is accepted by the given user.

4. The method of claim 1, wherein the option-selection usage pattern is further determined over a given time interval.

5. The method of claim 1, wherein the option-selection usage pattern is derived from a number N of right-click operations.

6. The method of claim 1, further comprising discarding the at least a portion of data collected during use of the application program prior to selection by the user of the threshold number of entries.

7. The method of claim 1, further comprising normalizing weights assigned during the weighting step.

8. The method of claim 1, wherein the second order comprises a reordering of the options listed in the first order based at least in part on the frequency of use by the given user as indicated by the option-selection usage pattern.

9. An apparatus comprising:
a processing device operatively coupled to a memory and configured to:
collect data during use of two or more pages of an application program to determine an option-selection usage pattern for a given user with respect to a given option-selection list with options listed in a first order, the option-selection usage pattern being determined in association with receipt of a selection by the user of a threshold number of entries of one or more of the options of the given option-selection list;
assign weights to the collected data based on time of selection of individual ones of the one or more options of the given option selection list relative to the given point in time wherein collected data closest to the given point in time is assigned a greater relative value than collected data remote from the given point in time;
generate a recommendation for a modified option-selection list with the options listed in a second order based on the option-selection usage pattern and the relative value assigned to the collected data; and
present the recommendation to the given user, the recommendation being presented via a graphical overlay on a given one of the two or more pages of the application program in which the modified option-selection list will be presented, the modified-option selection list being customized for a given set of operations that are capable of being performed for the given page;
wherein collecting data comprises discarding a portion of the collected data most remote from the given point in time upon occurrence of one or more additional selections by the user such that the threshold number of entries remains constant during one or more subsequent uses of the application program;
wherein determining the given point in time is recalculated in association with the occurrence of the one or more additional selections by the user to define one or more new given points in time;
wherein the determining, assigning, generating and presenting steps are repeated at the one or more new given points in time;
wherein, responsive to the recommendation being rejected by the user, the threshold number of entries is adjusted for the one or more new given points in time;
wherein the option-selection usage pattern is derived from right-click operations the given user performs for the application program; and
wherein the processing device is further configured to generate a three-dimensional cuboid array data structure for storing the collected data, the three-dimensional cuboid array data structure comprising:
a first dimension with entries corresponding to respective ones of a plurality of option-selection lists of the two or more pages of the application program including the given option-selection list;
a second dimension with entries corresponding to respective ones of options in each of the plurality of option-selection lists; and
a third dimension with entries corresponding to respective numbers of times that each of the options in each of the plurality of option-selection lists have been selected.

10. The apparatus of claim 9, wherein the processing device is further configured to enable the given user to accept or reject the recommendation.

11. The apparatus of claim 10, wherein the processing device is further configured to present the modified option-selection list to the given user the next time the given user uses the application program, when the recommendation is accepted by the given user.

12. The apparatus of claim 9, wherein the option-selection usage pattern is further determined over a given time interval.

13. The apparatus of claim 9, wherein the option-selection usage pattern is derived from a number N of right-click operations.

14. The apparatus of claim 9, wherein the processing device is further configured to discard at least a portion of data collected during use of the application program prior to selection by the user of the threshold number of entries.

15. The apparatus of claim 9, wherein the second order comprises a reordering of the options listed in the first order based on the frequency of use by the given user as indicated by the option-selection usage pattern.

16. An article of manufacture comprising a non-transitory processor-readable storage medium having stored therein program code of one or more software programs, wherein the program code when executed by at least one processing device causes said at least one processing device to perform steps of:
collecting data during use of two or more pages of an application program to determine an option-selection usage pattern for a given user with respect to a given option-selection list with options listed in a first order, the option-selection usage pattern being determined in association with receipt of a selection by the user of a threshold number of entries of one or more of the options of the given option-selection list;
determining a given point in time corresponding to a time in which the threshold number of entries is selected by the user;
assigning weights to the collected data based on time of selection of individual ones of the one or more options of the given option selection list relative to the given point in time wherein collected data closest to the given point in time is assigned a greater relative value than collected data remote from the given point in time;

generating a recommendation for a modified option-selection list with the options listed in a second order based on the option-selection usage pattern and the relative value assigned to the collected data; and presenting the recommendation to the given user, the recommendation being presented via a graphical overlay on a given one of the two or more pages of the application program in which the modified option-selection list will be presented, the modified-option selection list being customized for a given set of operations that are capable of being performed for the given page;

wherein collecting data comprises discarding a portion of the collected data most remote from the given point in time upon occurrence of one or more additional selections by the user such that the threshold number of entries remains constant during one or more subsequent uses of the application program;

wherein determining the given point in time is recalculated in association with the occurrence of the one or more additional selections by the user to define one or more new given points in time;

wherein the determining, assigning, generating and presenting steps are repeated at the one or more new given points in time;

wherein, responsive to the recommendation being rejected by the user, the threshold number of entries is adjusted for the one or more new given points in time;

wherein the option-selection usage pattern is derived from right-click operations the given user performs for the application program; and wherein the program code when executed by said at least one processing device further causes said at least one processing device to perform the step of generating a three-dimensional cuboid array data structure for storing the collected data, the three-dimensional cuboid array data structure comprising:

a first dimension with entries corresponding to respective ones of a plurality of option-selection lists of the two or more pages of the application program including the given option-selection list;

a second dimension with entries corresponding to respective ones of options in each of the plurality of option-selection lists; and a third dimension with entries corresponding to respective numbers of times that each of the options in each of the plurality of option-selection lists have been selected.

17. The article of claim 16, further comprising:

enabling the given user to accept or reject the recommendation; and presenting the modified option-selection list to the given user the next time the given user uses the application program, when the recommendation is accepted by the given user.

18. The method of claim 1, wherein the greater relative value assigned to the collected data is directly proportional to time elapsed relative to the given point in time.

19. The article of claim 16, wherein the option-selection usage pattern is further determined over a given time interval.

20. The article of claim 16, wherein the option-selection usage pattern is derived from a number N of right-click operations.

21. The article of claim 16, wherein the second order comprises a reordering of the options listed in the first order based at least in part on the frequency of use by the given user as indicated by the option-selection usage pattern.

* * * * *